INVENTOR.
DEAN ARTHUR YOUNG

United States Patent Office 3,331,766
Patented July 18, 1967

3,331,766
SELECTIVE HYDROCRACKING PROCESS
Dean Arthur Young, Yorba Linda, Calif., assignor to Union Oil Company of California, Los Angeles, Calif., a corporation of California
Filed Jan. 18, 1965, Ser. No. 426,260
16 Claims. (Cl. 208—78)

This application is a continuation-in-part of application Ser. No. 304,455 filed Aug. 26, 1963, which in turn is a continuation-in-part of application Ser. No. 194,508, filed May 14, 1962, now abandoned.

This invention relates to catalytic hydrocracking, and more particularly is concerned with a split-feed method for the separate hydrocracking of a fraction of the feed relatively rich in polycyclic hydrocarbons, and of a fraction relatively lean in polycyclic hydrocarbons and generally more paraffinic in nature. The objective is to convert, with maximum efficiency, both the polycyclic hydrocarbons and the paraffinic and monocyclic hydrocarbons to lower boiling hydrocarbons, boiling for example in the gasoline or jet fuel ranges. More particularly, the process is concerned with new methods for increasing the selectivity of hydrocracking, and for obtaining maximum efficiency in catalyst utilization. Briefly stated, the invention comprises the steps of (1) separating the initial feedstock into a polycyclic-lean portion and a polycyclic-rich portion; (2) subjecting the polycyclic-lean portion to catalytic hydrocracking in the presence of a hydrocracking catalyst comprising a crystalline, zeolitic molecular sieve cracking base upon which is deposited, preferably by ion-exchange, a minor proportion of a Group VIB and/or Group VIII hydrogenating metal component; (3) subjecting the polycyclic-rich feed portion to separate catalytic hydrocracking over a catalyst comprising an amorphous, or gel-type cracking base such as coprecipitated silica-alumina, upon which is deposited, as by impregnation, a small proportion of a Group VIB and/or Group VIII hydrogenating metal component.

In one modification of the process, the hydrocracking of the polycyclic-rich fraction may be preceded by an "integral" hydrofining step wherein organic nitrogen and/or sulfur compounds are decomposed to ammonia and hydrogen sulfide, and the total effluent is then subjected to hydrocracking. In another modification of the process, the polycyclic-lean, paraffin-rich feed portion which is treated over the molecular sieve catalyst may be modified by the addition thereto of a minor proportion of monocyclic aromatic hydrocarbons, in order to improve the efficiency and obtain higher ratios of iso-paraffins/normal paraffins than would be obtained in the absence of aromatic hydrocarbons. According to still another modification of the process, the molecular sieve catalyst may be maintained in a sulfided condition by the addition thereto of hydrogen sulfide, in order to produce a more aromatic high-octane gasoline, while the amorphous catalyst is maintained in a non-sulfided state in order to produce a non-aromatic jet fuel, diesel fuel, and/or a saturated light gas oil for blending with the polycyclic-lean feedstock to the molecular sieve catalyst zone.

It is known in the art that optimum hydrocracking conditions for converting paraffinic hydrocarbons differ considerably from the optimum conditions for converting aromatic hydrocarbons. It has hence been proposed in the past to separate hydrocracking feedstocks into a relatively aromatic fraction and a relatively paraffinic fraction, and subject the two fractions to separate hydrocracking under optimum conditions for each fraction. The present invention however stems from my discovery that hydrocracking catalysts based on amorphous cracking bases display a maximum efficiency for the conversion of polycyclic aromatic and/or naphthenic hydrocarbons, but are relatively inefficient for converting monocyclic and paraffinic hydrocarbons. It has further been found that a relatively newer class of hydrocracking catalysts, based upon certain crystalline, zeolitic molecular sieve cracking bases, are very efficient for the conversion of paraffinic and monocyclic hydrocarbons, but are relatively inefficient for converting polycyclic hydrocarbons. Without intending to limit the invention to any theoretical explanation for these discoveries, it is hypothesized that the differing distribution of active sites and pore sizes on the respective catalysts, and the different hydrocracking mechanisms for aromatic and for paraffin hydrocarbons are the underlying factors.

It is generally believed that the hydrocracking of polycyclic aromatic hydrocarbons proceeds first by hydrogenation of an aromatic ring, followed by cracking of the hydrogenated ring. Paraffins, paraffinic side-chains and naphthenes on the other hand must be cracked before they can be hydrogenated. Apparently, in the case of molecular sieve type catalysts, the relatively small crystal pore size places restrictions upon the accessibility of polycyclic hydrocarbons to active hydrogenation and cracking centers. The amorphous or gel-type catalysts on the other hand, have a more open, porous structure, and appear to embody a more nearly optimum configuration of active cracking and hydrogenation centers at the sites of preferential adsorption of heavy polycyclic hydrocarbons.

It has further been discovered as disclosed in my co-pending application, Ser. No. 182,263, filed Mar. 26, 1962, now U.S. Patent No. 3,159,567, that polycyclic aromatic hydrocarbons such as naphthalene and the like have an undesirable effect on the hydrocracking of paraffins. Monocyclic aromatics on the other hand do not significantly depress catalyst activity for the conversion of paraffins, but on the contrary have a favorable influence in improving the selectivity of hydrocracking, and improving the octane value of the gasoline produced by increasing the ratio of iso-/normal paraffins therein. Thus, in the polycyclic-lean hydrocracking step of this invention, improved efficiency is obtained not only by the use of optimum catalysts for that purpose, but also by including monocyclic aromatic hydrocarbons in the feed.

Polycyclic, fused-ring naphthenes, especially the high-boiling members, are found to behave somewhat like the aromatic analogs, due to the ease with which they are partially dehydrogenated, even at pressures up to 2,500 p.s.i.g., and temperatures as low as 600° F.

From the foregoing, it will be apparent that the principal object of this invention is to improve hydrocracking efficiency by providing catalysts of maximum efficiency for the treatment of selected feed fractions which differ in polycyclic hydrocarbon content. An overall objective is to reduce the total catalyst inventory required to maintain a given feed throughput and conversion to lower boiling hydrocarbons. Still another object is to increase the selectivity of the conversion to products of desired boiling range rather than to light gases such as methane, ethane, and the like. Another object is to prolong the effective life of hydrocracking catalysts by using separate catalysts for the conversion of different feed fractions for which they are uniquely adapted. Still another object is to produce an aromatic, high-octane gasoline by hydrocracking the polycyclic-lean gas oil in the presence of hydrogen sulfide. Other objects will be apparent from the more detailed description which follows.

The invention may perhaps be more readily understood from the accompanying drawings, which are flowsheets illustrating two particular modifications thereof.

Figure 1:
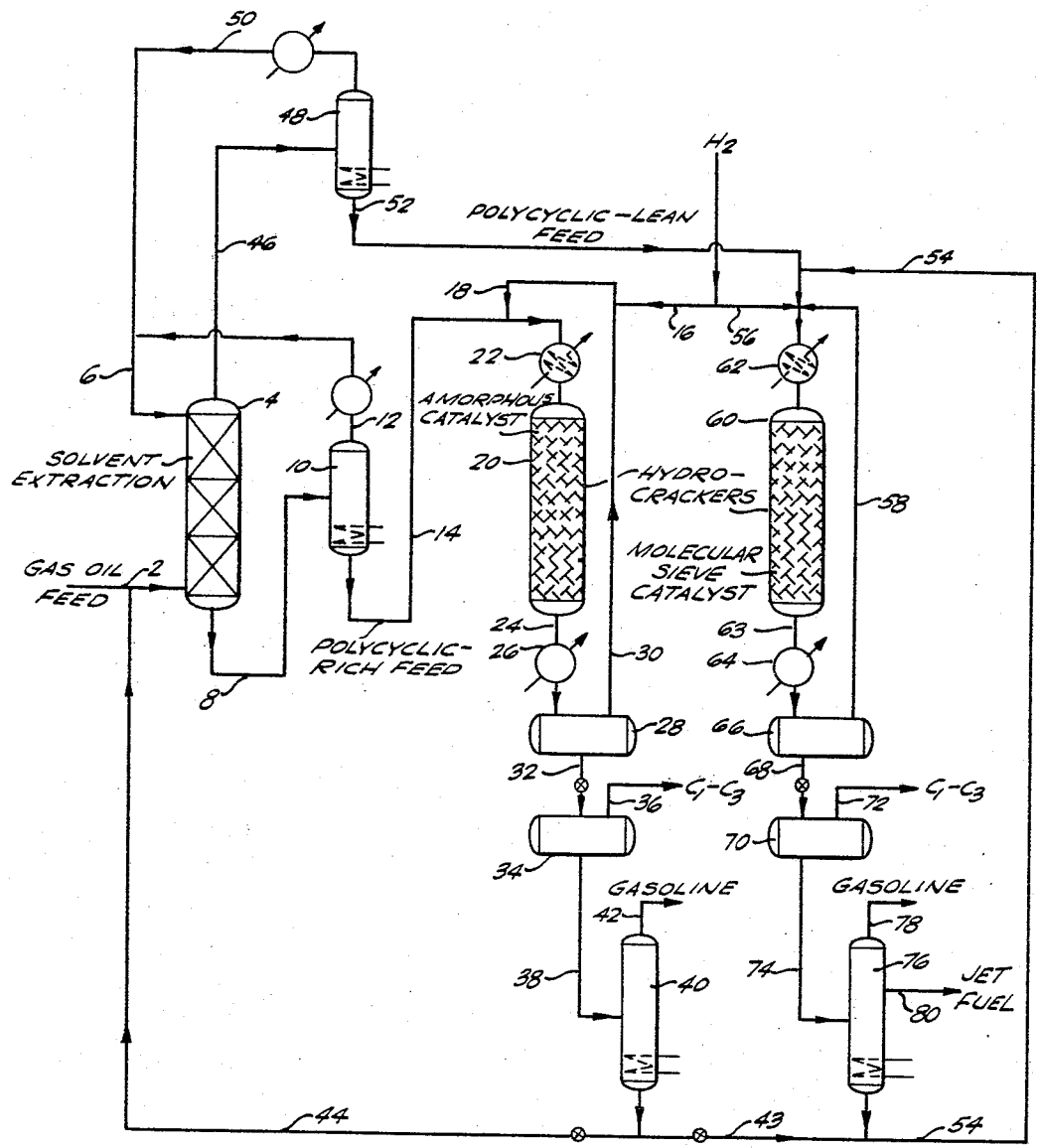
FIGURE 1 illustrates one modification of the invention wherein the feedstock is separated by solvent extraction into respective polycyclic-rich and polycyclic-lean hydrocarbon fractions prior to hydrocracking.

Referring more particularly to FIGURE 1, the initial feedstock, consisting for example of a straight-run gas oil boiling betweeen about 400–800° F., is brought in via line 2 and separated into a polycyclic-rich extract and a polycyclic-lean raffinate in solvent extraction column 4. Any conventional method of separating polycyclic-rich from paraffinic and/or monocyclic hydrocarbons may be employed to the same end, as for example fractional distillation, azeotropic distillation selective adsorption, extractive distillation and the like. However, in the modification illustrated, the feedstock is introduced into the bottom of countercurrent extraction column 4, which is preferably packed with a suitable material such as Raschig rings or the like to facilitate contact between countercurrently flowing liquids. The solvent employed for the extraction may comprise any of the well known polar compounds which exhibit a selective solvency for aromatic hydrocarbons as opposed to relatively non-aromatic hydrocarbons, and which are suitably low-boiling. Suitable solvents include for example ethanol, methanol, phenol, furfural, ethylene glycol monomethyl ether, acetonitrile, sulfur dioxide and the like. The ratio of solvent/oil is preferably adjusted so as to extract at least about 75% of the polycyclic aromatics, but not more than about 40% of the monocyclic aromatic hydrocarbons and not more than about 20% of the paraffinic hydrocarbons.

The solvent is admitted to the top of column 4 via line 6 and passes downwardly, countercurrently to the rising hydrocarbon stream. The polycyclic-rich extract is withdrawn at the bottom of the column via line 8, and transferred to a small fractionating column 10, from which the volatile solvent is removed as overhead via line 12, condensed and recycled to the top of extraction column 4. The stripped polycyclic-rich extract is withdrawn from the bottom of the column via line 14, mixed with recycle and fresh hydrogen from lines 16 and 18, and passed into hydrocracking unit 20 via preheater 22. This polycyclic-rich extract is composed mainly of polycyclic aromatic hydrocarbons (i.e., polycyclic hydrocarbons containing at least one benzene ring), a smaller proportion of polynaphthenes and alkyl benzenes, and in some cases will contain organic nitrogen and/or sulfur compounds which were present in the feed, and which generally are selectively extracted along with the aromatic hydrocarbons in extraction column 4. The feed-hydrogen mixture passes downwardly through hydrocracker 20 in contact with the amorphous catalyst to be subsequently described, under contacting conditions within the following general ranges:

HYDROCRACKING CONDITIONS FOR POLYCYCLIC-RICH FEED

| | Operative | Preferred |
|---|---|---|
| Temperature, ° F. | 400–850 | 450–700 |
| Pressure, p.s.i.g. | 400–3,000 | 800–2,000 |
| LHSV, v./v./hr | 0.5–15 | 1–10 |
| H₂/oil ratio, s.c.f./b. | 500–20,000 | 2,000–12,000 |

Selection of the specific operating conditions will of course depened upon the specific activity of the catalyst involved, as well as other factors such as general refractoriness of the feed, etc. Normally it is preferred to adjust the hydrocracking conditions so as to obtain about 20–70 volume-present conversion per pass to desired product.

The hydrocracked effluent from reactor 20 is withdrawn via line 24, condensed in cooling unit 26, and passed into high-pressure separator 28, from which recycle hydrogen is withdrawn via line 30 and recycled as previously described. The liquid condensate in separator 28 is then flashed via line 32 into low-pressure separator 34, from which light hydrocarbon gases are exhausted via line 36. The low-pressure condensate in separator 34 is then transferred via line 38 to fractionating column 40, from which desired product such as gasoline is taken overhead via line 42. The bottoms from column 40, normally comprising mixed paraffinic and aromatic hydrocarbons boiling above about 400° F., is withdrawn as bottoms via line 44, and may be recycled to the initial feed line 2 for further separation into relatively polycyclic-rich and polycyclic-lean hydrocracking feed components. In some cases, it may be found that the unconverted oil from fractionating column 40 will be sufficiently rich in polycyclic aromatics and/or naphthenes to be recycled directly to hydrocracker 20, but in most cases it is sufficiently lean in polycyclic hydrocarbons to be useable directly in the hydrocracking unit for converting the polycyclic-lean portion to be subsequently described. For this purpose, it may be diverted via line 43 to line 54.

The raffinate from extraction column 4, comprising mainly paraffins and monocyclic hydrocarbons with substantial paraffin side-chains, is withdrawn via line 46 and sent to raffinate stripping column 48, from which residual dissolved solvent is recovered overhead via line 50 and recycled to line 6 for reuse in extraction column 4. The bottoms from stripping column 48 is withdrawn via line 52, mixed with paraffinic recycle oil from line 54, and with fresh and recyccle hydrogen from lines 56 and 58, and the mixture is then passed into hydrocracking unit 60 via preheater 62. Feeed-plus-hydrogen passes downwardly in hydrocracker 60 in contact with a molecular sieve type catalyst to be subsequently described, and subjected to hydrocrackingg therein under the following general conditions:

HYDROCRACKING CONDITIONS FOR POLYCYCLIC-LEAN FEED

| | Operative | Preferred |
|---|---|---|
| Temperature, ° F. | 400–850 | 450–700 |
| Pressure, p.s.i.g. | 100–3,000 | 500–2,000 |
| LHSV, v./v./hr | 0.5–15 | 1–10 |
| H₂/oil ratio, s.c.f./b. | 200–15,000 | 500–10,000 |

The above conditions are suitably correlated with the objective of providing about 30–80 volume-percent conversion per pass to desired products.

The effluent from hydrocracker 60 is withdrawn via line 63, condensed in cooling unit 64, and passed into high-pressure separator 66, from which recycle hydrogen is withdrawn via line 58 as preferably described. The liquid condensate in separator 66 is then transferred via line 68 into low-pressure separator 70, from which light hydrocarbon gases are exhausted via line 72. The low-pressure condensate in separator 70 is then transferred via line 74 to fractionating column 76, from which desired products such as gasoline and/or jet fuel are recovered via lines 78 anad 80 respectively. The unconverted oil boiling above the desired porduct ranges is withdrawn as bottoms via line 54 and recycled as previously described. Alternatively, this paraffinic bottoms fraction may be utilized in other products such as diesel fuels or the like.

It is not intended that the invention be limited to the details described above. In particular, it is contemplated in cases where the polycyclic-rich feed extract in line 14 contains substantial quantities of organic nitrogen compounds, that the upper portion of hydrocracking catalyst in reactor 20 can be replaced with a suitable non-cracking hydrofining catalyst such as the oxides and/or sulfides of cobalt, molybdenum, tungsten, nickel and the like supported on a substantially neutral carrier such as activated alumina. Such an "integral" hydrofining operation serves to convert organic nitrogen and/or sulfur compounds to less troublesome and more volatile impurities such as ammonia and hydrogen sulfide, which do not repress catalytic cracking activity to the same extent as the original organic impurities. Such a hydrofining operation can be carried out under the same general conditions outlined above for the hydrocracking of the aromatic extract.

It is preferred that the solvent extraction in column 4 be controlled, as by adjusting the solvent/oil ratio, so as to bring about substantial separation between polycyclic aromatic hydrocarbons and monocyclic alkaryl hydrocarbons, a portion or substantially all of the latter being recovered along with the raffinate in line 46. In this manner, the monocyclic aromatics, or at least a substantial portion thereof, are allowed to go to hydrocracking unit 60, in admixture with the paraffinic feed. The presence of the monocyclic aromatic hydrocarbons improves the efficiency of paraffin hydrocracking, as previously described. It is also contemplated that an extraneous source of monocyclic aromatics, e.g., benzene, toluene, xylenes, etc. may be admitted directly to paraffinic feed line 52 from any desired outside source. Normally it is desirable to employ about 0.5% to 10% by volume of monocyclic aromatics based on total feed.

As is well known the distribution of hydrocarbons between raffinate and extract in solvent extraction processes as above described depends primarily upon the carbon/hydrogen ratio of each molecular species. The order of increasing carbon/hydrogen ratio among the principal hydrocarbon types found in the feedstocks here concerned goes approximately as follows: (1) paraffins, (2) monocyclic alkyl naphthenes, (3) polycyclic naphthenes free of fused rings, (4) highly alkylated benzenes, (5) fused-ring polycyclic naphthenes, (6) poly-aromatic hydrocarbons free of fused rings, (7) fused-ring benzene-naphthenes, and (8) poly-aromatic fused-ring hydrocarbons. Although there is considerable overlapping in carbon/hydrogen ratio between members of different of these groups, the conditions of extraction can be controlled, as by adjusting temperature, solvent/oil ratio, etc., so as to segregate into the extract 75–95% of the hydrocarbons in groups 6, 7 and 8, and to retain in the raffinate 75–95% of the hydrocarbons in groups 1 and 2. The hydrocarbons in groups 3, 4 and 5 permissibly can, and normally will be, distributed in both phases. The critical requirement for purposes of this invention is that essentially all, i.e., at least about 95%, of the heavy, fused-ring poly-aromatic hydrocarbons boiling above about 600° F., and preferably also the lower-boiling species, be segregated into the extract. Further, it is preferred that essentially all of the fused-ring naphthene-benzenes, and the fused-ring poly-naphthenes, especially the species of these categories boiling above about 600° F., be segregated into the extract.

A further preference is to control the solvent extraction step so that the polycyclic-lean raffinate recovered for treatment in hydrocracker 60 will contain less than about 2% by volume, and preferably less than about 0.5%, of fused-ring polycyclic hydrocarbons, i.e., fused-ring poly-aromatics plus fused-ring naphthene-benzenes.

In cases involving a feedstock having an end-boiling-point above about 700° F., and wherein the raffinate from the solvent extraction contains high-boiling fused-ring polynaphthenes, it is preferred to subject such raffinate to a fractional distillation step to separate a bottoms fraction rich in poly-naphthenes boiling above about 700° F. This bottoms fraction is then blended with the polycyclic-rich extract, and the overheat is sent to the hydrocracking step for polycyclic-lean hydrocarbons.

In some cases it will be found feasible, and perhaps preferable, to eliminate the solvent extraction step entirely, and merely subject the initial feed to fractional distillation. In many feedstocks, particularly cracked cycle oils, most of the polycyclic hydrocarbons are concentrated in the heavy ends, and the paraffins and alkyl benzenes in the light ends. Hence, in these instances, a simple fractional distillation can provide an overhead fraction essentially free of heavy polycyclics, and a bottoms fraction rich in polycyclics. A simple fractional distillation is also preferable in the case of high-boiling, non-aromatic, naphthenic oils.

Figure 2:
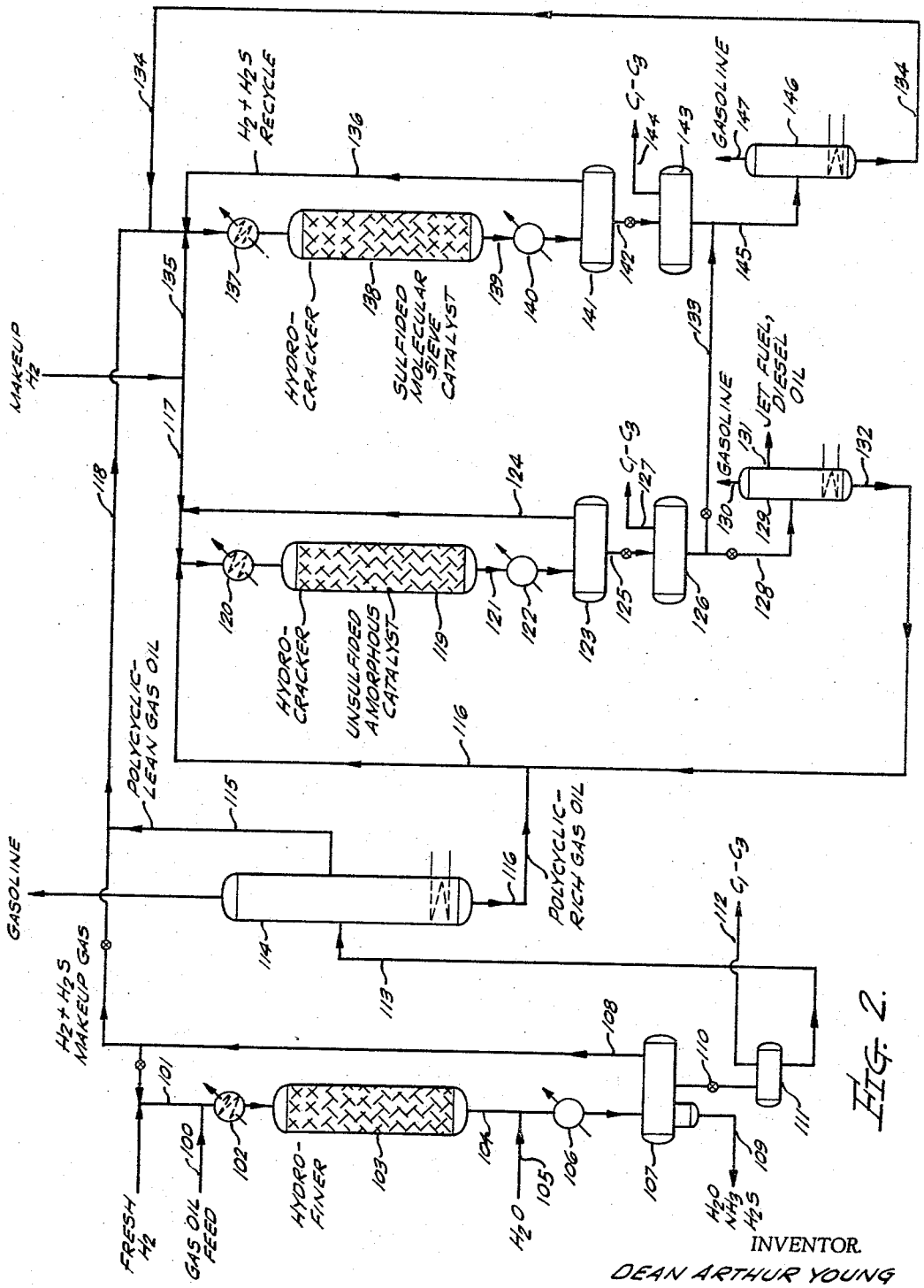
FIGURE 2 illustrates another modification of the invention involving pre-hydrofining followed by fractionation to separate the polycyclic-rich and polycyclic-lean fractions, with the polycyclic-lean fraction being hydrocracked in the presence of hydrogen sulfide, and the polycyclic-rich fraction in the absence of hydrogen sulfide.

Referring now to FIGURE 2, the initial feedstock from line 100, consisting for example of a straight-run gas oil boiling between about 400–1,000° F., is blended with fresh and recycle hydrogen from line 101, preheated to incipient hydrofining temperature in heater 102, and then passed directly into hydrofiner 103, where catalytic hydrofining proceeds under substantially conventional conditions. Suitable hydrofining catalysts include for example, mixtures of oxides and/or sulfides of cobalt and molybdenum, or of nickel and tungsten, preferably supported on a carrier such as alumina, or alumina containing a small amount of coprecipitated silica gel. Other suitable catalysts include in general the oxides and/or sulfides of the Group VIB and/or Group VIII metals, preferably supported on adsorbent oxide carriers such as alumina, silica, titania, and the like. The hydrofining operation may be conducted either adiabatically or isothermally, and under the following general conditions:

HYDROFINING CONDITIONS

| | Operative | Preferred |
|---|---|---|
| Temperature, °F | 600–850 | 650–750 |
| Pressure, p.s.i.g | 500–3,000 | 800–2,000 |
| LHSV, v./v./hr | 0.5–10 | 1–5 |
| $H_2$/oil ratio, s.c.f./b | 500–20,000 | 1,000–10,000 |

The above conditions are suitably adjusted so as to reduce the nitrogen content of the feed to below about 25 parts per million, and preferably below about 10 parts per million.

The total hydrofined effluent from hydrofiner 103 is withdrawn via line 104 and mixed therein with wash water introduced via line 105. The entire mixture is then cooled and condensed in condenser 106 and transferred to high-pressure separator 107. Hydrogen-rich recycle gas containing some hydrogen sulfide is withdrawn via line 108, and aqueous wash water containing dissolved ammonia and some of the hydrogen sulfide is withdrawn via line 109. A portion of the recycle gas is returned to the hydrofiner 103, while another portion thereof is mixed with the polycyclic-lean feed in line 118 and transferred to hydrocracking unit 138 to be subsequently described. The sour recycle gas from separator 107 constitutes the primary source of hydrogen sulfide for hydrocracking unit 138. The liquid hydrocarbon phase in separator 107 is flashed via line 110 into low-pressure separator 111, from which flash gases comprising methane, ethane, propane and the like are withdrawn via line 112. The liquid hydrocarbons in separator 111 are then transferred via line 113 to fractionating column 114.

Fractionating column 114 is operated primarily for the purpose of recovering light gasoline, a light gas oil relatively lean in polycyclic hydrocarbons and boiling below about 650° F., and a heavy gas oil relatively rich in polycyclic hydrocarbons and boiling above about 550° F. The polycyclic-lean gas oil is withdrawn as a side-cut via line 115. The polycyclic-rich gas oil, which is substantially free of hydrogen sulfide, constitutes the primary feedstock for catalytic hydrocracking over the amorphous catalyst in hydrocracker 119.

The polycyclic-rich gas oil is withdrawn at the bottom of column 114 via line 116, mixed with recycle and fresh hydrogen from lines 117 and 124, and fed into hydrocracking unit 119 via preheater 120. The feed-hydrogen mixture passes downwardly through hydrocracker 119 in contact with the amorphous catalyst to be subsequently described, under the hydrocracking conditions for polycyclic-rich feeds previously described in connection with FIGURE 1.

The hydrocracked effluent from reactor 119 is withdrawn via line 121, condensed in cooling unit 122, and passed into high-pressure separator 123, from which recycle hydrogen is withdrawn via line 124 and recycled as previously described. The liquid condensate in separator 123 is then flashed via line 125 into low-pressure separator 126, from which light hydrocarbon gases are exhausted via line 127. When hydrocracker 119 is operated primarily for the production of mid-boiling-range products such as jet fuel and/or diesel fuel, the low-pressure condensate in separator 126 may be transferred via line 128 to fractionating column 129, from which desired products such as jet fuel and/or diesel oil are withdrawn via line 131. A minor gasoline product is withdrawn overhead via line 130. The bottom from column 129, normally comprising unconverted heavy gas oil, is withdrawn via line 132, and recycled to polycyclic-rich feed line 116 for further hydrocracking. To minimize gasoline production, relatively low temperatures and/or high space velocities are employed in hydrocracker 119, while relatively high temperatures and/or low space velocities are used when gasoline is the principal desired product.

However, where gasoline is the principal desired product from the overall process, another modification of the process provides greater efficiency and selectivity of conversion. In this modification, hydrocracker 119 is operated under relatively mild conditions of temperature and/or space velocity, such that most of the feed is hydrocracked to mid-boiling-range products in the 400–650° F. boiling range, and less than about 25% is converted to gasoline. By operating in this manner, fractionating column 129 may be eliminated, and the entire condensate in separator 126 transferred via line 133 to fractionator 146, wherein the material boiling above the gasoline range is separated for treatment in hydrocracker 138, along with the recycle oil from hydrocracker 138. The principal advantage of this modification is that hydrocrackers 119 and 138 can be operated under conditions optimum for the conversion of heavy gas oil to light gas oil, and light gas oil to gasoline, respectively. This minimizes the overall production of light gases and coke, by virtue of the lower temperature and/or higher space velocities used in hydrocracker 119.

The polycyclic-lean fraction from fractionator 114, comprising mainly paraffinic and monocyclic hydrocarbons boiling between about 400° and 600° F., and substantially free of nitrogen and sulfur compounds, is withdrawn via line 115, mixed in line 118 with sour recycle gas from line 108 as previously described, and with unconverted recycle oil from line 134. Fresh makeup hydrogen may be added if necessary from line 135. After adding additional recycle gas from line 136, the entire mixture is preheated to incipient hydrocracking temperatures in heater 137, and passed into zeolite-catalyst hydrocracking unit 138. Hydrocracker 138 is operated sour by adjusting the proportion of sour recycle gas diverted from line 108 to line 118. The proportion of hydrogen sulfide required for sour operation varies somewhat, depending upon the catalyst used. The objective is to maintain the hydrogenating metal on the catalyst in at least a partially sulfided state. Hydrogen being present, there is a reversible reaction:

$$MS + H_2 \rightleftharpoons M + H_2S$$

For the iron group metals (nickel, iron & cobalt), very low concentrations of $H_2S$ are effective, while somewhat higher concentrations are required for the Group VIII noble metals. In general, it is preferred to maintain at least about 0.01, and preferably at least about 0.1, millimole of hydrogen sulfide per mole of hydrogen in the feed mixture, but in some instances as little as 0.0001 millimole is effective. Other process variables are adjusted within the following ranges:

SOUR HYDROCRACKING CONDITIONS FOR POLYCYCLIC-LEAN FEED

| | Operative | Preferred |
| --- | --- | --- |
| Temperature, °F | 450–850 | 500–750 |
| Pressure, p.s.i.g. | 400–3,000 | 800–2,000 |
| LHSV, v./v./hr. | 0.5–15 | 1–5 |
| $H^2$/oil ratio, s.c.f./b. | 500–20,000 | 2,000–12,000 |

The effluent from hydrocracker 138 is withdrawn via line 139, condensed in cooler 140 and transferred to high-pressure separator 141, from which recycle hydrogen is withdrawn via line 136 and utilized as previously described. The condensed hydrocarbons in separator 141 are then flashed via line 142 into low-pressure separator 143, from which flash gases comprising methane, ethane, propane and the like are withdrawn via line 144. The liquid hydrocarbon product in separator 143 is withdrawn via line 145 and transferred to fractionating column 146 from which gasoline is withdrawn as overhead via line 147 and the bottoms recycled via line 134 as previously described.

The initial feedstocks which may be treated herein include in general any mineral oil fraction having an initial boiling point above the conventional gasoline range, i.e., above about 350° F., and having an end-boiling-point of up to about 1,000° F. This includes straight-run gas oils, coker distillate gas oils, deasphalted crude oils, cycle oils derived from catalytic or thermal cracking operations and the like. These fractions may be derived from petroleum crude oils, shale oils, tar sand oils, coal hydrogenation products and the like. Specifically, it is preferred to employ feedstocks boiling between about 400 and 1,000° F., having an API gravity of 15–40°, and containing at least about 10% by volume of aromatic components. Such oils may also contain from about 0.1% to 5% of sulfur and from about 0.01% to 2% by weight of nitrogen.

The amorphous catalysts to be used in hydrocracking units 20 or 119 for hydrocracking the polycyclic-rich feed fraction, may comprise any desired combination of a conventional amorphous cracking base with a Group VIB and/or Group VIII metal hydrogenating component. Suitable cracking bases include for example coprecipitated mixtures of two or more difficulty reducible oxides such as silica-alumina, silica-magnesia, silica-zirconia, alumina-boria, silica-titania, silica-zirconia-titania, and the like. Acidic metal phosphates such as aluminum phosphate may also be used. The preferred cracking bases comprise coprecipitated composite gels of silica and alumina containing about 50–90% silica, coprecipitated composites of silica, titania, and zirconia containing about 5–75% of each component, coprecipitated composites of silica and magnesia, or of silica and zirconia, and the like. Any of these cracking bases may be further promoted by the addition of a halide such as HF, $BF_3$, $SiF_4$ and the like.

The hydrogenating component is normally added to the cracking base by aqueous impregnation, and/or by cation exchange methods. Normally, about 0.1 to 25% by weight of hydrogenating component is employed. (The term "hydrogenating component" as used herein is intended to include the free metals and compounds thereof, e.g., the oxides and sulfides.) The preferred hydrogenating metals are the Group VIII noble metals, and especially platinum, palladium, rhodium and iridium. Nickel, iron, cobalt, chromium, molybdenum and tungsten may be used to less advantage. The noble metals normally are used in relatively small proportions of about 0.2 to 2% by weight. The finished catalysts are preferably employed in the form of ⅛ to ¼-inch pellets or granules.

The term "amorphous" as used herein is intended to designate a solid state wherein crystallinity is not discernible in the powdered material by X-ray diffraction analysis. This does not preclude the presence of mircocrystalline micelles, such as may be present in many gel structures. The crystalline molecular sieve structures, on the other hand, display definite crystallinity which is readily detectable by X-ray diffraction analysis.

The catalysts for use in hydrocracking units 60 or 138 for hydrocracking the polycylic-lean feed fraction are distinctly different from the above-described amorphous catalysts. They may contain the same type and amounts of hydrogenating component described in connection with the amorphous catalysts, but this hydrogenating component is deposited upon a partially dehydrated, zeolitic crystalline molecular sieve, e.g., of the "X" or "Y" crystal types, said molecular sieves having relatively uniform pore diameters of about 6 to 14 A., and comprising silica, alumina, and one or more exchangeable zeolitic cations.

A particularly active and useful class of molecular sieve cracking bases are those having a relatively high $SiO_2/Al_2O_3$ ratio, e.g., between about 3.0 and 10.0. The most active forms are those wherein the exchangeable zeolitic cations are hydrogen and/or a polyvalent metal such as magnesium, calcium, chromium or zinc. In particular, the "Y" molecular sieves, wherein the $SiO_2/Al_2O_3$ ratio is about 5, are preferred, either in their hydrogen form, or a divalent metal form. Synthetic mordenite may also be employed. Normally, such molecular sieves are prepared first in the sodium or potassium form, and the monovalent metal is ion-exchanged out with a polyvalent metal, or where the hydrogen form is desired, with an ammonium salt followed by heating to decompose the zeolitic ammonium ion and leave a hydrogen ion. It is not necessary to exchange out all of the monovalent metal; the final compositions may contain up to about 6% by weight of $Na_2O$, or equivalent amounts of other monovalent metals. Molecular sieves of this nature are described more particularly in U.S. Patent Nos. 3,130,006 and 3,130,007.

As in the case of the X molecular sieves, the Y sieves also contain pores of relatively uniform diameter in the individual crystals. In the case of X sieves, the pore diameters may range between about 6 and 14 A., depending upon the metal ions present, and this is likewise the case in the Y sieves, although the latter usually are found to have crystal pores of about 9 to 10 A. in diameter.

In the case of molecular sieve type cracking bases, it is desirable to deposit the hydrogenating metal thereon by ion exchange. This can be accomplished by digesting the zeolite, preferably in its ammonium form, with an aqueous solution of a suitable compound of the desired metal, wherein the metal is present in a cationic form, and then reducing to form the free metal, as described for example in Belgian Patent No. 598,686.

The following examples are cited to demonstrate the critical features of the above-described invention, but are not intended to be limiting in scope:

*Example I*

In this example, tetralin, a typical fused-ring polycyclic aromatic hydrocarbon found in gas oils, was subjected to hydrocracking over two molecular sieve catalysts and over two amorphous catalysts in order to determine the relative efficiency of such catalysts for hydrocracking polycyclic aromatic hydrocarbons. All the tests were carried out at 1,000 p.s.i.g., 8 liquid hourly space velocity, and using 20,000 s.c.f. of hydrogen per barrel of feed. The relative conversions were measured in terms of product gravities, an increase in API gravity over that of the feed indicating hydrogenation and/or hydrocracking. In all cases where the product gravity is above 25.6° API, there was necessarily some substantial hydrocracking, because simple hydrogenation of tetralin would result mainly in cis-decalin which has a gravity of 25.6° API. The catalysts tested were as follows:

*Catalyst No. 1.*—a crystalline zeolitic Y molecular sieve (4.6 $SiO_2/Al_2O_3$ mole-ratio) in its hydrogen form ("decationized"; 1.5% $Na_2O$) and loaded by ion-exchange with 0.5% by weight of palladium.

*Catalyst No. 2.*—a crystalline zeolitic Y molecular sieve (4.6 $SiO_2/Al_2O_3$ mole-ratio) in its magnesium form, containing about 3% by weight of zeolitic magnesium and 0.5% by weight of palladium added by ion-exchange.

*Catalyst No. 3.*—a synthetic coprecipitated amorphous silica-alumina cracking catalyst containing about 87% silica and 13% alumina, and containing 0.4% palladium added by impregnation with palladium chloride solution.

*Catalyst No. 4.*—a synthetic coprecipitated silica-alumina cracking catalyst, as in Catalyst No. 3, containing 0.5% of palladium incorporated therein by ion-exchange with an aqueous solution of a tetramine palladium complex.

The results of the several tests were as follows:

TABLE 1.—HYDROCRACKING OF TETRALIN

| | Catalyst No. | | | |
|---|---|---|---|---|
| | 1 | 2 | 3 | 4 |
| | Composition | | | |
| | Crystalline H-"Y" sieve +0.5% Pd | Crystalline Mg-"Y" sieve +0.5% Pd | Amorphous $SiO_2$-$Al_2O_3$ +0.4% Pd | Amorphous $SiO_2$-$Al_2O_3$ +0.5% Pd |
| | Gravity of Feed, °API | | | |
| | 14.4 | 14.4 | 14.4 | 14.4 |
| Hours on stream | 1 / 17 | 1 / 7 | 2 / 20 | 1 / 23 |
| Temp., °F | 600 / 600 | 650 / 670 | 611 / 611 | 612 / 612 |
| Product Gravity, °API | 38.9 / 24.2 | 29.0 / 15.4 | 31.2 / 30.9 | 30.0 / 31.1 |

It will be noted that the initial high activity of catalysts 1 and 2 declined rapidly, so that after a few hours substantially no hydrocracking was taking place. In contrast, catalysts 3 and 4 did not diminish in hydrocracking activity over a period of at least 20 hours. It is thus clear that the amorphous catalysts display a much higher sustained activity for hydrocracking polycyclic aromatic hydrocarbons than do the crystalline catalysts 1 and 2.

Example II

Catalysts 1 and 4 of Example I were compared in activity for the hydrocracking of a typical gas oil paraffin, namely n-dodecane. The hydrocracking conditions were the same as in Example I, and product gravities likewise indicate hydrocracking activity, except that in this case it should be noted that any increase in product API gravity over the feed gravity necessarily indicates hydrocracking, since further saturation without cracking is not possible. The results of the test were as follows:

TABLE 2.—HYDROCRACKING OF N-DODECANE

| Catalyst No. | |
|---|---|
| 1 | 4 |
| Composition | |
| Crystalline H-"Y" sieve +0.5% Pd | Amorphous SiO$_2$-Al$_2$O$_3$ +0.5% Pd |
| Gravity of Feed, °API | |
| 56.5 | 56.4 |

| Temp., °F. | Product Gravity, °API | Temp., °F. | Product Gravity, °API |
|---|---|---|---|
| 550 | 60 | | |
| 598 | 70.2 | 606 | 57.0 |
| 600 | 71 | 604 | 57.1 |
| 651 | 86.8 | 658 | 58.4 |
| 651 | 88.4 | 655 | 59.0 |
| 650 | 87.8 | 656 | 59.8 |
| 649 | 87.7 | 655 | 59.0 |

The much higher initial and sustained activity of the molecular sieve catalyst for hydrocracking paraffins is clearly apparent.

Example III

This example demonstrates the deleterious effects of polycyclic aromatics upon paraffin hydrocracking. A molecular sieve hydrocracking catalyst, essentially identical to catalyst No. 1 of Example I, was first used to hydrocrack n-dodecane, then a mixture of n-dodecane and napthalene, and finally the pure n-dodecane, the run being continuous. Hydrocracking conditions were the same as in Example I. The results were as follows:

TABLE 3.—HYDROCRACKING OF N-DODECANE-NAPHTHALENE MIXTURE AT 600° F.

| Feed naphthalene content | Hours on Stream | Product characteristics | |
|---|---|---|---|
| | | Gravity, °API | Vol. percent C$_3$–C$_9$ |
| None | 11 | 69.3 | |
| Do | 14 | 70.3 | |
| Do | 17 | 70.3 | 53.4 |
| Do | 19 | 67.4 | |
| 5 Vol. Percent | 23 | 63.1 | |
| Do | 29 | 61.6 | 47.9 |
| Do | 36 | 59.7 | 17.1 |
| Do | 38 | 63.1 | |
| None | 41 | 64.1 | 29.2 |

The foregoing results clearly show that, upon adding 5% naphthalene to the feed, the conversion dropped rapidly. They also show that the catalyst was not permanently deactivated, for upon eliminating naphthalene from the feed, the conversion began to increase. This deactivating effect is not observed however when monocyclic aromatics are added to the feed.

Example IV

This example shows that high-boiling polynaphthenes have an effect similar to naphthalene in deactivating molecular sieve catalysts, and that the amorphous catalysts are more efficient for hydrocracking high-boiling, non-aromatic polycyclic naphthenic oils.

Four catalysts substantially identical to those employed in Example I were utilized for hydrocracking a non-aromatic mineral oil ("Kaydol") boiling between about 610° and 960° F., and containing by volume 14% paraffins, 38% mononaphthenes and 48% polynaphthenes. Hydrocracking conditions were the same as in Example I. The results were as follows:

TABLE 4.—HYDROCRACKING OF NAPHTHENIC MINERAL OIL

| Catalyst No. | | | | | | | | |
|---|---|---|---|---|---|---|---|---|
| 1 | | 2 | | 3 | | 4 | | |
| Composition | | | | | | | | |
| Crystalline H-"Y" sieve +0.5% Pd | | Crystalline Mg-"Y" sieve +0.5% Pd | | Amorphous SiO$_2$-Al$_2$O$_3$ +0.4% | | Amorphous SiO$_2$-Al$_2$O$_3$ +0.5% Pd | | |
| Gravity of Feed, °API | | | | | | | | |
| 28.4 | | 28.4 | | 28.4 | | 28.4 | | |

| | | | | | | | | |
|---|---|---|---|---|---|---|---|---|
| Hrs. on stream | 23 | 26 | 23 | 26 | 23 | 26 | 23 | 26 |
| Temp., °F | 699 | 699 | 702 | 701 | 699 | 704 | 700 | 700 |
| Product Gravity, °API | 44 | 41.7 | 61.1 | 57.1 | 68.1 | 60.5 | 65.1 | 64.1 |

The rate of decline in product gravity over the four-hours runs indicates that the crystalline catalysts 1 and 2 were being deactivated at a rate about 2 to 4 that of the amorphous catalysts 3 and 4. Also it was noted that the products from catalysts 1 and 2 had a light green color, indicating the presence of polycyclic aromatics, while the products from catalysts 3 and 4 were water-white.

Distillation of the respective products gave the following product fractions:

TABLE 5

|  | Catalyst No. | | | |
| --- | --- | --- | --- | --- |
|  | 1 | 2 | 3 | 4 |
| Boiling Range of Product Fractions: | | | | |
| 0–120° F., Vol Percent | 7.6 | 24.0 | 19.1 | 20.9 |
| 120–360° F.: | | | | |
| Gasoline, Vol Percent | 28.9 | 38.9 | 55.9 | 61.8 |
| °API | 60.6 | 61.1 | 59.6 | 60.3 |
| 360–500° F.: | | | | |
| Lt. Gas Oil, Vol Percent | 5.2 | 4.6 | 16.5 | 10.7 |
| °API | 38.4 | 40.8 | 42.9 | 45.0 |
| 500° F.+Bottoms, Vol Percent | 50.5 | 21.0 | 9.5 | 7.0 |
| °API | 28.3 | 28.9 | 38.1 | 41.0 |

The important points to note above are that crystalline catalysts 1 and 2 were much less active for converting the heavy naphthenic hydrocarbons boiling above 500° F. than were the amorphous catalysts 3 and 4, and further that the respective bottoms fractions from catalysts 1 and 2 had a much lower gravity than the similar fractions from catalysts 3 and 4. It is apparent that the amorphous catalysts are much more active for hydrogenating and cracking heavy polycyclic naphthenes than the crystalline catalysts. It is apparent also however, that the crystalline catalysts were more active than the amorphous catalysts for converting light gas oil naphthenes in the 360–600° F. boiling range.

By fractionating this feedstock to separate a light fraction boiling up to about 700–750° F., from the remaining bottoms fraction, subjecting the light fraction to hydrocracking over the molecular sieve catalysts 1 or 2, and the bottoms fraction to hydrocracking over the amorphous catalysts 3 or 4, the deactivation rates of the respective catalysts are approximately equalized, and greatly improved conversion efficiencies are obtained, as compared to using either catalyst alone.

Results analogous to those indicated in the foregoing examples are obtained when other catalysts and conditions, other feedstocks and other process conditions within the broad purview of the above disclosure are employed. It is hence not intended to limit the invention to the details of the examples or drawing, but only broadly as defined in the following claims.

I claim:

1. A process for hydrocracking a mineral oil feedstock containing both polycyclic hydrocarbons and hydrocarbons containing less than two cyclic structures, which comprises:
   (A) subjecting said feedstock to a hydrocarbon separation step, and recovering therefrom a fraction relatively rich in polycyclic hydrocarbons and a fraction relatively lean in polycyclic hydrocarbons;
   (B) subjecting said polycyclic-rich fraction plus added hydrogen to catalytic hydrocracking in contact with a catalyst consisting essentially of a composite of silica gel coprecipitated with at least one other gel from the class consisting of alumina, zirconia, titania and magnesia, and upon which is deposited a small proportion of a Group VIII metal hydrogenating component;
   (C) subjecting said polycyclic-lean fraction plus added hydrogen to catalytic hydrocracking in contact with a catalyst consisting essentially of a crystalline, zeolitic alumino-silicate molecular sieve cracking base having a SiO$_2$/Al$_2$O$_3$ mole-ratio between about 3 and 10, relatively uniform crystal pore diameters between about 6 and 14 A., and wherein the zeolitic cations are predominantly hydrogen ions and/or polyvalent metal ions, and upon which is deposited a small proportion of a Group VIII metal hydrogenating component; and
   (D) recovering desired low-boiling hydrocarbons from each of steps (B) and (C).

2. A process as defined in claim 1 wherein said molecular sieve cracking base is of the Y crystal type and wherein said Group VIII metal is added thereto by cation exchange.

3. A process as defined in claim 1 wherein the hydrogenating component on said molecular sieve cracking base is a Group VIII noble metal.

4. A process as defined in claim 1 wherein said polycyclic-lean feed fraction contains less than about 2% by volume of fused-ring polycyclic aromatic hydrocarbons.

5. A process as defined in claim 4 wherein said polycyclic-lean feed fraction contains between about 0.5% and 10% by volume of monocyclic aromatic hydrocarbons.

6. A process defined in claim 1 wherein said hydrocracking step (B) is carried out essentially in the absence of sulfur, and said hydrocracking step (C) is carried out in the presence of at least about 0.0001 millimole of hydrogen sulfide per mole of hydrogen in the hydrocracking zone, and wherein unconverted oil boiling above said desired low-boiling hydrocarbons recovered from each of steps (B) and (C) is hydrocracked in step (C).

7. A hydrocracking process for converting to gasoline-boiling-range hydrocarbons a gas oil feedstock containing both polycyclic hydrocarbons and hydrocarbons containing less than two cyclic structures, which comprises:
   (A) subjecting said feedstock to solvent extraction with a selective solvent for aromatic hydrocarbons and recovering therefrom an aromatic extract rich in fused-ring polycyclic aromatic hydrocarbons, and a relatively paraffinic raffinate containing less than about 2% by volume of fused-ring polycyclic aromatic hydrocarbons;
   (B) subjecting said aromatic extract plus added hydrogen to catalytic hydrocracking in contact with a catalyst consisting essentially of (1) a coprecipitated cracking base comprising silica gel and at least one other oxide gel from the class consisting of alumina, zirconia, titania and magnesia and (2) a minor proportion of a Group VIII metal hydrogenating component;
   (C) subjecting said paraffinic raffinate plus added hydrogen to catalytic hydrocracking in contact with a catalyst consisting essentially of (1) a crystalline, zeolitic alumino-silicate, molecular sieve cracking base having a SiO$_2$/Al$_2$O$_3$ mole-ratio between about 3 and 10, relatively uniform crystal port diameters between about 6 and 14 A., and wherein the zeolitic cations are predominantly hydrogen ions and/or polyvalent metal ions, and (2) a minor proportion of a Group VIII metal hydrogenating component;
   (D) fractionating the effluent from step (B) to recover a relatively aromatic gasoline product and a higher boiling relatively aromatic oil; and
   (E) fractionating the effluent from step (C) to recover a relatively paraffinic gasoline product and a higher boiling paraffinic oil.

8. A process as defined in claim 7 wherein the hydrogenating component on said amorphous solid cracking base is a Group VIII noble metal.

9. A process as defined in claim 7 wherein the hydrogenating component on said molecular sieve cracking base is a Group VIII noble metal.

10. A process as defined in claim 7 wherein said polycyclic-lean feed fraction contains between about 0.5% and 10% by volume of monocyclic aromatic hydrocarbons.

11. A process for hydrocracking a mineral oil feedstock comprising a heavy fraction relatively rich in polycyclic hydrocarbons and a light fraction relatively lean in polycyclic hydrocarbons, which comprises:
- (A) subjecting said feedstock to fractional distillation to recover a heavy, polycyclic-rich fraction and a light, polycyclic-lean fraction;
- (B) subjecting said polycyclic-rich fraction plus added hydrogen to catalytic hydrocracking in contact with a catalyst consisting essentially of a composite of silica gel coprecipitated with at least one other gel from the class consisting of alumina, zirconia, titania and magnesia, upon which is deposited a small proportion of a Group VIII metal hydrogenating component;
- (C) subjecting said polycyclic-lean fraction plus added hydrogen to catalytic hydrocracking in contact with a catalyst consisting essentially of a crystalline, zeolitic, alumino-silicate molecular sieve cracking base having a $SiO_2/Al_2O_3$ mole-ratio between about 3 and 10, relatively uniform crystal pore diameters between about 6 and 14 A., and wherein the zeolitic cations are predominantly hydrogen ions and/or polyvalent metal ions, and upon which is deposited a small proportion of a Group VIII metal hydrogenating component; and
- (D) recovering desired low-boiling hydrocarbons from each of steps (B) and (C).

12. A process as defined in claim 11 wherein said feedstock is a cracked cycle oil.

13. A process as defined in claim 11 wherein said feedstock is a heavy naphthenic mineral oil containing polynaphthenes boiling above about 700° F.

14. A process as defined in claim 11 wherein the hydrogenating component on said molecular sieve cracking base is a Group VIII noble metal.

15. A process for hydrocracking a hydrocarbon feedstock comprising a heavy fraction relatively rich in polycyclic hydrocarbons and a light fraction relatively lean in polycyclic hydrocarbons and containing organic nitrogen and/or sulfur compounds, which comprises:
- (A) subjecting said feedstock to catalytic hydrofining in the presence of added hydrogen and a hydrofining catalyst to effect decomposition of said organic nitrogen and sulfur compounds with resultant formation of ammonia and/or hydrogen sulfide;
- (B) subjecting effluent from said hydrofining step to fractional distillation to recover a polycyclic-rich hydrocarbon fraction and a polycyclic-lean hydrocarbon fraction;
- (C) subjecting said polycyclic-rich fraction plus added hydrogen to catalytic hydrocracking substantially in the absence of sulfur and in contact with a catalyst consisting essentially of a composite of silica gel coprecipitated with at least one other gel from the class consisting of alumina, zirconia, titania and magnesia, upon which is deposited a small proportion of a Group VIII metal hydrogenating component;
- (D) subjecting said polycyclic-lean fraction plus added hydrogen to catalytic hydrocracking in the presence of at least about 0.0001 millimole of hydrogen sulfide per mole of hydrogen in the hydrocracking zone, and in contact with a catalyst consisting essentially of a crystalline, zeolitic alumino-silicate molecular sieve cracking base having a $SiO_2/Al_2O_3$ mole-ratio between about 3 and 10, relatively uniform crystal pore diameters between about 6 and 14 A., and wherein the zeolitic cations are predominantly hydrogen ions and/or polyvalent metal ions, and upon which is deposited a small proportion of a Group VIII metal hydrogenating component; and
- (E) recovering desired low-boiling hydrocarbons from each of steps (C) and (D).

16. A process as defined in claim 15 wherein hydrocracking step (D) is carried out under relatively severe conditions of temperature and/or space velocity so as to produce primarily a gasoline product, and hydrocracking step (C) is carried out under relatively mild conditions of temperature and/or space velocity so as to produce primarily a light gas oil product which is then further hydrocracked in step (D) along with said polycyclic-lean fraction.

References Cited

UNITED STATES PATENTS

| | | | |
|---|---|---|---|
| 2,627,495 | 2/1953 | Lanning | 208—80 |
| 3,080,311 | 3/1963 | Mertes | 208—78 |
| 3,130,006 | 4/1964 | Rabo et al. | 23—110 |
| 3,132,087 | 5/1964 | Kelley et al. | 208—60 |
| 3,140,253 | 7/1964 | Plank et al. | 208—120 |
| 3,159,567 | 12/1964 | Young | 208—111 |

DELBERT E. GANTZ, *Primary Examiner.*

ALPHONSO D. SULLIVAN, PAUL M. COUGHLAN, *Examiners.*

A. RIMENS, *Assistant Examiner.*